US012081959B2

(12) United States Patent
Lee et al.

(10) Patent No.: US 12,081,959 B2
(45) Date of Patent: Sep. 3, 2024

(54) DISPLAY DEVICE AND SURROUND SOUND SYSTEM

(71) Applicant: LG ELECTRONICS INC., Seoul (KR)

(72) Inventors: Eunjung Lee, Seoul (KR); Sijin Kim, Seoul (KR); Hyorim Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 196 days.

(21) Appl. No.: 17/440,141

(22) PCT Filed: Aug. 27, 2019

(86) PCT No.: PCT/KR2019/010930
§ 371 (c)(1),
(2) Date: Sep. 16, 2021

(87) PCT Pub. No.: WO2021/040074
PCT Pub. Date: Mar. 4, 2021

(65) Prior Publication Data
US 2022/0150654 A1 May 12, 2022

(51) Int. Cl.
*H04S 7/00* (2006.01)
*H04R 5/02* (2006.01)
*H04R 29/00* (2006.01)

(52) U.S. Cl.
CPC ................. *H04S 7/30* (2013.01); *H04R 5/02* (2013.01); *H04R 29/001* (2013.01);
(Continued)

(58) Field of Classification Search
CPC ......... H04S 7/30; H04S 2400/13; H04R 5/02; H04R 29/001; H04R 2420/07; H04R 2499/15
See application file for complete search history.

(56) References Cited

U.S. PATENT DOCUMENTS 5,386,478 A 1/1995 Plunkett
8,976,986 B2 * 3/2015 Angeloff .................. H03G 3/30 381/108
(Continued)

FOREIGN PATENT DOCUMENTS

EP 3358863 8/2018
JP 2002345079 11/2002
(Continued)

OTHER PUBLICATIONS

PCT International Application No. PCT/KR2019/010930, International Searching Authority dated May 27, 2020, 4 pages.
(Continued)

*Primary Examiner* — Andrew L Sniezek
(74) *Attorney, Agent, or Firm* — LEE, HONG, DEGERMAN, KANG & WAIMEY

(57) ABSTRACT

The present disclosure relates to a display device in which a volume balance is automatically adjusted and a surround sound system. The display device includes an audio output interface, a wireless communication interface connected to at least one external speaker, and a controller configured to the audio output interface and the external speaker to output a sound, wherein the controller controls a volume of the external speaker according to a level of a sound output from the audio output interface.

16 Claims, 11 Drawing Sheets

(52) U.S. Cl.
CPC ...... *H04R 2420/07* (2013.01); *H04R 2499/15* (2013.01); *H04S 2400/13* (2013.01)

(56) References Cited

U.S. PATENT DOCUMENTS

| | | | | |
|---|---|---|---|---|
| 2004/0213421 | A1* | 10/2004 | Jacobs | H04S 7/00 381/104 |
| 2018/0226931 | A1* | 8/2018 | Kim | H03G 3/3005 |
| 2018/0357037 | A1* | 12/2018 | Lau | H04R 3/12 |
| 2020/0091958 | A1* | 3/2020 | Curtis | H04S 7/301 |
| 2022/0295206 | A1* | 9/2022 | Park | H04N 5/60 |

FOREIGN PATENT DOCUMENTS

| | | |
|---|---|---|
| JP | 2009194893 | 8/2009 |
| JP | 2012090164 | 5/2012 |
| KR | 1020170011999 | 2/2017 |

OTHER PUBLICATIONS

European Patent Office Application Serial No. 19943720.3, Search Report dated Apr. 11, 2023, 2 pages.

* cited by examiner (a)

(b)

(UNIT:dBSPL)

| CENTER SOUND | FIRST SURROUND SOUND | SECOND SURROUND SOUND |
|---|---|---|
| 0 | 0 | 0 |
| 2 | 1 | 1 |
| 10 | 8 | 8 |
| ... | ... | ... |
| 70 | 45 | 45 |
| 75 | 50 | 50 |
| 80 | 60 | 60 |

FIG. 11

| SET VOLUME | SOUND LEVEL OF AUDIO OUTPUT INTERFACE |
|---|---|
| 0 | 0 (dBSPL) |
| 1 | 1 (dBSPL) |
| 2 | 3 (dBSPL) |
| ... | ... |
| 98 | 65 (dBSPL) |
| 99 | 68 (dBSPL) |
| 100 | 70 (dBSPL) |

FIG. 12

| VOLUME | SOUND LEVEL OF FIRST EXTERNAL SPEAKER |
|---|---|
| 0 | 0 (dBSPL) |
| 1 | 1 (dBSPL) |
| 2 | 2 (dBSPL) |
| ... | ... |
| 90 | 45 (dBSPL) |
| ... | ... |
| 126 | 68 (dBSPL) |
| 127 | 70 (dBSPL) |

FIG. 13

| VOLUME | SOUND LEVEL OF SECOND EXTERNAL SPEAKER |
|---|---|
| 0 | 0 (dBSPL) |
| 1 | 1 (dBSPL) |
| 2 | 2 (dBSPL) |
| ... | ... |
| 50 | 45 (dBSPL) |
| ... | ... |
| 126 | 90 (dBSPL) |
| 127 | 90 (dBSPL) |

DISPLAY DEVICE AND SURROUND SOUND SYSTEM

CROSS-REFERENCE TO RELATED APPLICATIONS

This application is the National Stage filing under 35 U.S.C. 371 of International Application No. PCT/KR2019/010930, filed on Aug. 27, 2019, the contents of which are all incorporated by reference herein in their entirety.

TECHNICAL FIELD

The present disclosure relates to a display device and a surround sound system including the same, and more particularly, to a display device to which at least one external speaker is connected, and a surround sound system including the same.

BACKGROUND ART

With the recent development of not only video technology but also audio technology, the need for general users of TV to listen to good sound audio is gradually increasing.

Accordingly, the user may connect an external speaker to the TV, and the TV may provide stereoscopic sound to the user through an internal speaker and an external speaker connected to the TV. That is, the TV outputs sound with two or more channels through an internal speaker and an external speaker, thereby providing a user with an effect that gives the user a sense of realism as if the user were there.

In particular, in order to provide an optimal stereoscopic sound to the user, a balance between the sound level of the TV and the sound level of the external speaker needs to be achieved. When a first external speaker for outputting a left surround sound and a second external speaker for outputting a right surround sound are connected to the TV, a balance among the sound level of the TV, the sound level of the first external speaker, and the sound level of the second external speaker needs to be adjusted.

It is cumbersome for the user to control the speakers one by one, and there is a limit in adjusting the volume balance for a non-professional user.

Meanwhile, in order to adjust the volume balance, the volume of each of the first and second external speakers may be preset according to the set volume of the TV. There is a problem in that the volume balance is not properly adjusted because the volume of the sound that the user hears varies depending on the installation location of the external speaker.

DISCLOSURE

Technical Problem

An object of the present disclosure is to provide a display device and a surround sound system which control a volume of an external speaker such that a volume balance is achieved according to a set volume.

An object of the present disclosure is to provide a display device and a surround sound system which automatically adjust a sound level of an external speaker such that a volume balance is achieved regardless of output power of the external speaker, an installation environment, and the like.

An object of the present disclosure is to provide a display device and a surround sound system that automatically adjusts a sound level of an external speaker such that a volume balance is achieved at a viewing position desired by a user.

An object of the present disclosure is to provide a display device and a surround sound system that automatically adjust a volume balance between a main sound and a surround sound.

Technical Solution

According to an embodiment of the present disclosure, a display device may include an audio output interface, a wireless communication interface connected to at least one external speaker, and a controller configured to control the audio output interface and the external speaker to output a sound, and the controller may control a volume of the external speaker according to a level of a sound output from the audio output interface.

The controller may control a volume of the external speaker according to a set volume.

The display device may further include a storage configured to store sound pressure balancing data in which a level of the surround sound are mapped to each of levels of the center sound.

The controller may acquire a level of the center sound that is most similar to a sound level of the audio output interface from the sound pressure balancing data, acquire a level of the surround sound mapped to the acquired level of the center sound, and control the external speaker to output sound at the acquired level of the surround sound.

The display device may further include a user input interface configured to receive an audio signal from a remote control device, and the controller may acquire at least one of information on the level of the sound output from the audio output interface or information on the level of the sound output from the external speaker based on the audio signal acquired through the user input interface.

The controller may control the remote control device to acquire a first audio signal when the audio output interface is being controlled to output a test sound while changing a set volume from a minimum value to a maximum value, and control the remote control device to acquire a second audio signal when the external speaker is being controlled to output the test sound while changing a control volume of the external speaker from a minimum value to a maximum value.

The controller may acquire a sound level of the audio output interface for each set volume based on the audio signal obtaining by recording a sound output from the audio output interface.

The controller may acquire a sound level of the external speaker for each control volume of the external speaker based on the audio signal obtaining by recording a sound output from the external speaker.

The display device may further include a storage configured to store at least one of main sound data in which sound levels of the audio output interface are mapped to set volumes or sub sound data in which sound levels of the external speaker are mapped to control volumes of the external speaker based on the audio signal received from the remote control device.

The storage may further store sound pressure balancing data in which levels of the surround sound are mapped to levels of the center sound, and the controller may acquire a first level, which is a sound level of the audio output interface when the set volume is a first volume from the main sound data, acquire a second level, which is a level of the center sound most similar to the first level, from the sound pressure balancing data, acquire a third level, which is a level of the surround sound corresponding to the second level, from the sound pressure balancing data, acquire a fourth level, which is a sound level of the external speaker most similar to the third level, from the sub sound data, acquire a second volume, which is a control volume of the external speaker mapped to the fourth level, from the sub sound data, and adjust a volume of the external speaker to the second volume.

The controller may store first main sound data or first sub sound data in the storage based on the audio signal acquired at a first location by the remote control device, and store second main sound data or second sub sound data in the storage based on the audio signal acquired at a second location by the remote control device, and the first main sound data may be different from the second main sound data, and the first sub sound data may be different from the second sub-sound data.

The controller may update the main sound data and the sub sound data when receiving a sound optimization command or when the external speaker is initially connected to the wireless communication interface.

The controller may change a sound level of the audio output interface when the set volume is changed, and change a control volume of the external speaker when the sound level of the audio output interface is changed.

The display device may further include a storage configured to store sound level information of the audio output interface, sound level information of the first external speaker, and the sound level information of the second external speaker when the first external speaker and the second external speaker are connected through the wireless communication interface.

According to an embodiment of the present disclosure, a surround sound system include a display device, and an external speaker connected to the display device in a wireless manner, the display device may output a center sound, the external speaker may output a surround sound, and a volume of the external speaker may be controlled according to a level of the center sound.

Advantageous Effects

According to the embodiments of the present disclosure, since the volume of the external speaker is automatically adjusted such that the volume balance is achieved according to the volume of the display device, there is an advantage that the user does not have to manually adjust the device volume of the external speaker. That is, since the display device automatically adjusts the volume balance by controlling the volume of the external speaker according to the set volume, there is an advantage that the user can easily create a stereoscopic sound environment.

According to the embodiments of the present disclosure, since the volume balance is adjusted irrespective of device types and installation environment of the external speakers, reliability can be improved, and simplicity and ease of installation of the surround sound system can be provided.

According to the embodiments of the present disclosure, since the volume balance is adjusted according to the viewing position of the user, it is possible to provide a stereoscopic sound suitable for the viewing environment of each user.

According to an embodiment of the present disclosure, since the volume of the external speaker is controlled according to the level of the center sound and the level of the surround sound stored in advance, an optimal surround sound system can be installed even when the user does not have expert knowledge.

DESCRIPTION OF DRAWINGS

FIGS. 11 to 13 are exemplary diagrams of sound level information for each device at a viewing position obtained by a display device according to a second embodiment of the present disclosure.

MODE FOR INVENTION

Hereinafter, embodiments relating to the present disclosure will be described in detail with reference to the accompanying drawings. The suffixes "module" and "interface" for components used in the description below are assigned or mixed in consideration of easiness in writing the specification and do not have distinctive meanings or roles by themselves.

Figure 1:
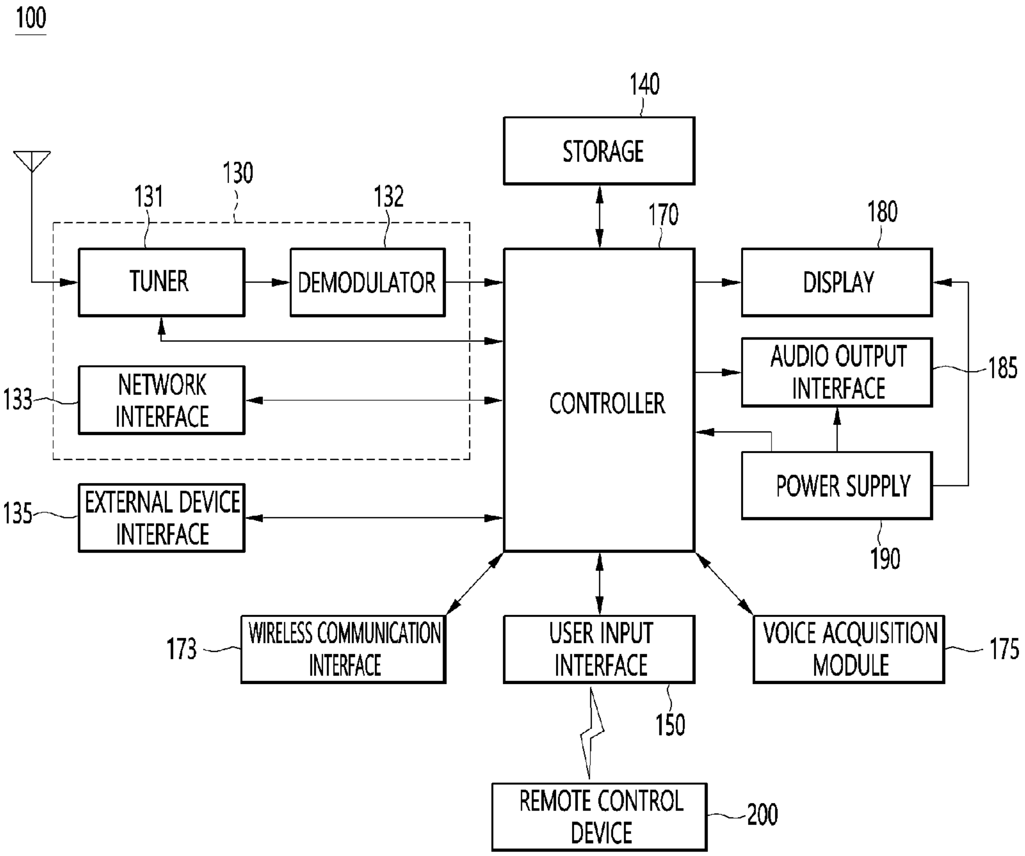
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception module 130, an external device interface 135, a storage 140, a user input interface 150, a controller 170, a wireless communication interface 173, a voice acquisition module 175, a display 180, an audio output interface 185, and a power supply 190.

The broadcast reception module 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The network interface 133 can provide an interface for connecting the display device 100 to a wired/wireless network including internet network. The network interface 133 can transmit or receive data to or from another user or another electronic device through an accessed network or another network linked to the accessed network.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 135 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks. The wireless communication unit 173 may be a wireless transceiver. In more detail, the wireless communication unit 173 may typically include one or more modules which permit communications such as wireless communications between a display device 100 (e.g., or mobile terminal) and a wireless communication system, communications between the mobile terminal 100 and another mobile terminal, or communications between the display device 100 and an external server. Further, the wireless communication unit 173 may typically include one or more modules which connect the display device 100 to one or more networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The voice acquisition module 175 can acquire audio. The voice acquisition module 175 may include at least one microphone (not shown), and can acquire audio around the display device 100 through the microphone (not shown).

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present disclosure described below can be performed by one of the display device described with reference to FIG. 1, an image processing device such as the separated set-top box, and a content playback device including the display 180 and the audio output interface 185.

The audio output interface 185 receives the audio processed signal from the controller 170 and outputs the sound. The audio output unit 185 may be implemented as a receiver, a speaker, a buzzer, or the like.

The power supply 190 supplies the corresponding power throughout the display device 100. In particular, the power supply 190 supplies power to the controller 170 that can be implemented in the form of a System On Chip (SOC), a display 180 for displaying an image, and the audio output interface 185 for outputting audio or the like.

Specifically, the power supply 190 may include a converter for converting an AC power source into a DC power source, and a DC/DC converter for converting a level of the DC source power.

Figure 2:
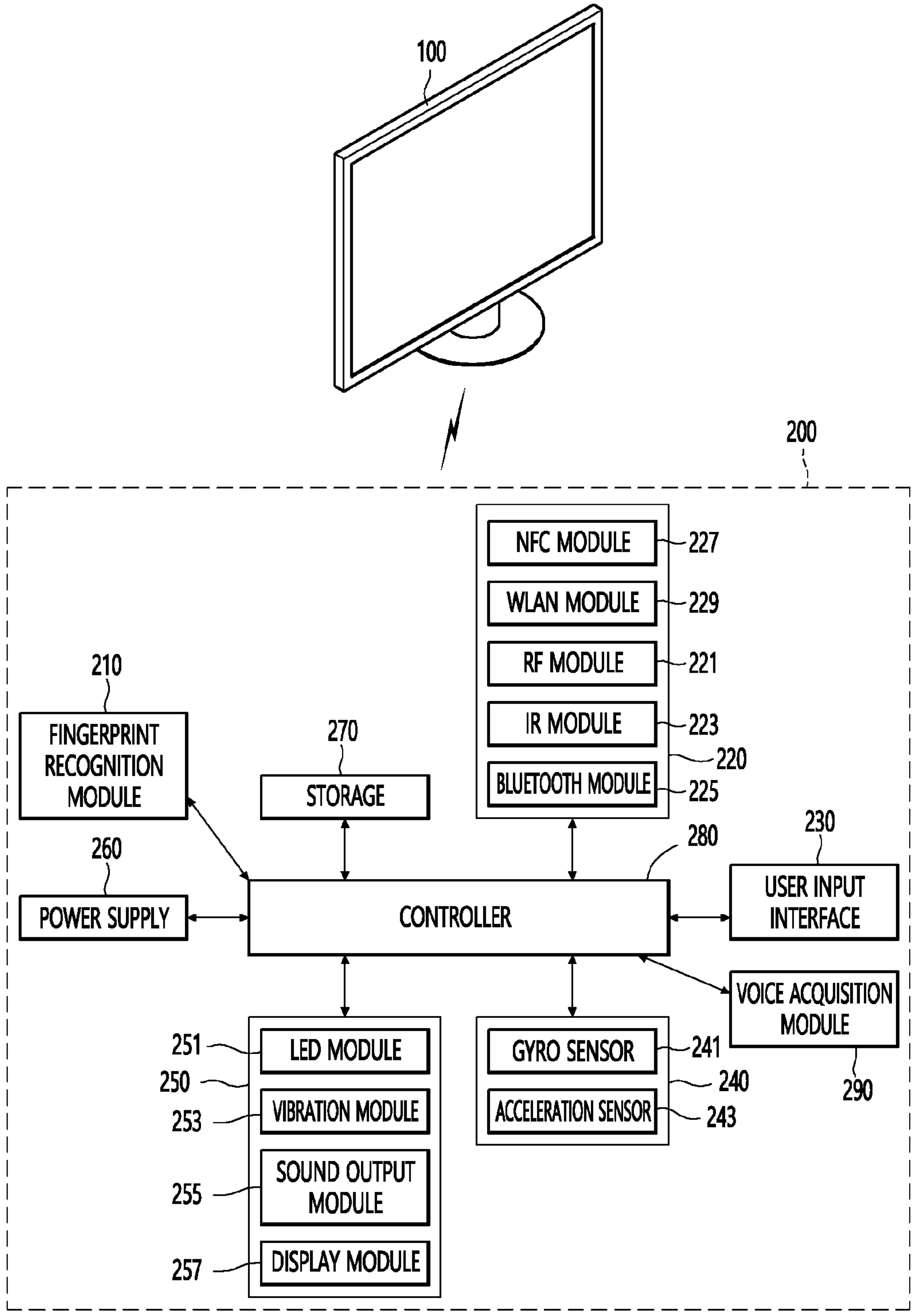
FIG. 2 is a block diagram of a remote control device according to an embodiment of the present disclosure.
Figure 3:
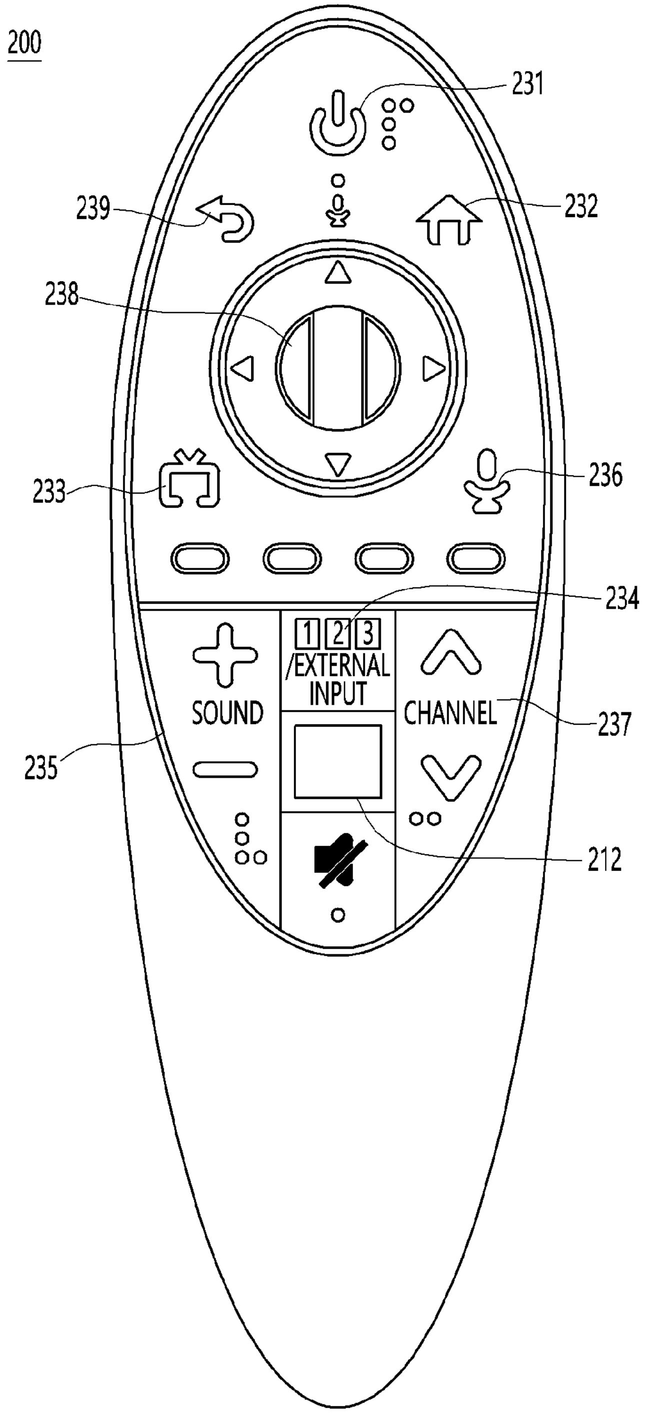
FIG. 3 shows an example of an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition module 210, a wireless communication interface 220, a user input interface 230, a sensor 240, an output interface 250, a power supply 260, a storage 270, a controller 280, and a voice acquisition module 290.

Referring to FIG. 2, the wireless communication interface 220 transmits/receives signals to/from an arbitrary any one of display devices according to the above-mentioned embodiments of the present disclosure.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output interface 250 can output image or voice signals corresponding to a manipulation of the user input interface 230 or corresponding to signals transmitted from the display device 100. A user can recognize whether the user input interface 230 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input interface 230 or a signal corresponding to a movement of the remote control device 200 sensed by the sensor 240 to the display device 100 through the wireless communication interface 220.

Additionally, the voice acquisition module 290 of the remote control device 200 can obtain voice.

The voice acquisition module 290 can include at least one microphone 291 and obtain voice through the microphone 291.

Figure 4:
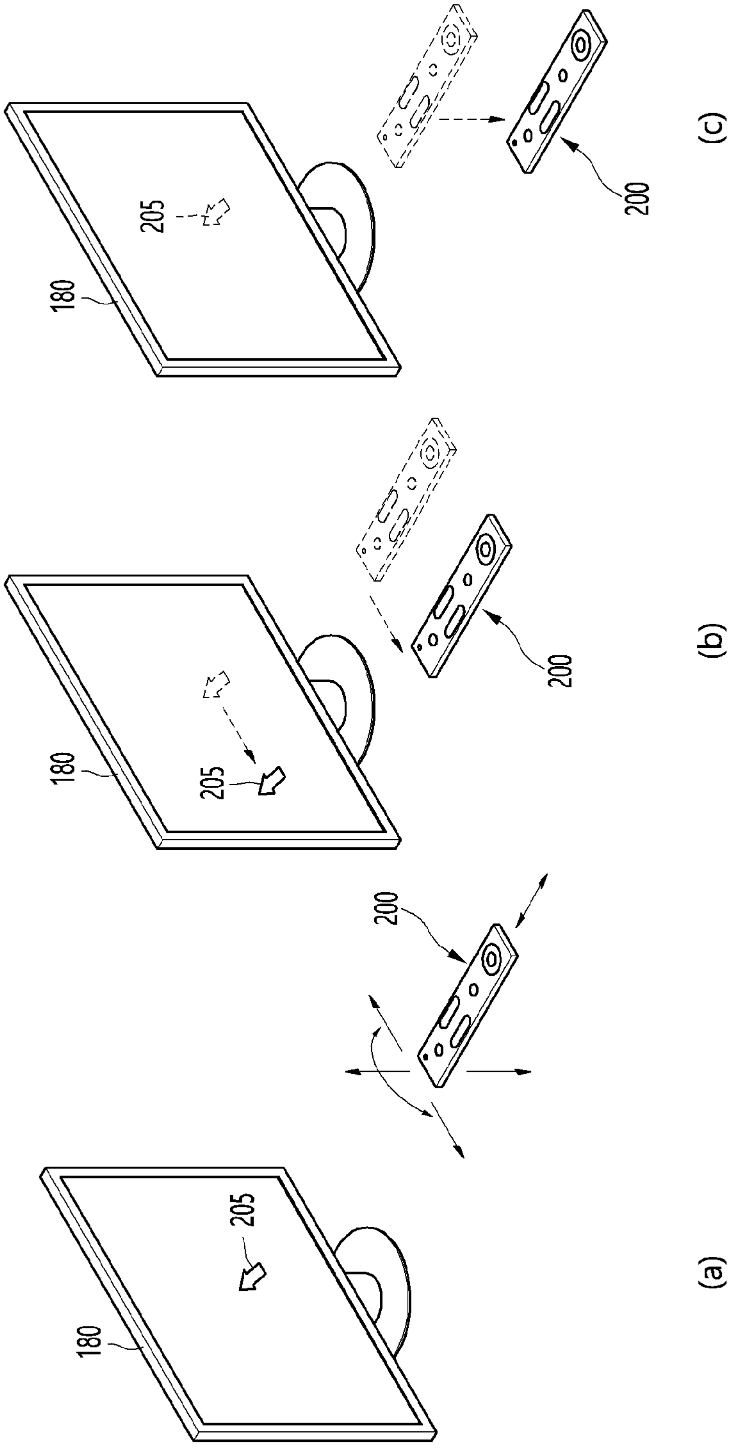
FIG. 4 shows an example of using a remote control device according to an embodiment of the present disclosure.

Then, FIG. 4 is described.

FIG. 4 is a view of utilizing a remote control device according to an embodiment of the present disclosure.

FIG. 4A illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display 180. Thus, a selection area in the display 180 corresponding to the pointer 205 can be zoomed in and displayed largely.

On the other hand, if a user moves the remote control device 200 close to the display 180, a selection area in the display 180 corresponding to the pointer 205 can be zoomed out and displayed reduced.

On the other hand, if the remote control device 200 is away from the display 180, a selection area can be zoomed out and if the remote control device 200 is close to the display 180, a selection area can be zoomed in.

Additionally, if a specific button in the remote control device 200 is pressed, the recognition of a vertical or horizontal movement can be excluded. That is, if the remote control device 200 is moved away from or close to the display 180, the up, down, left, or right movement can not be recognized and only the back and fourth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

Figure 5:
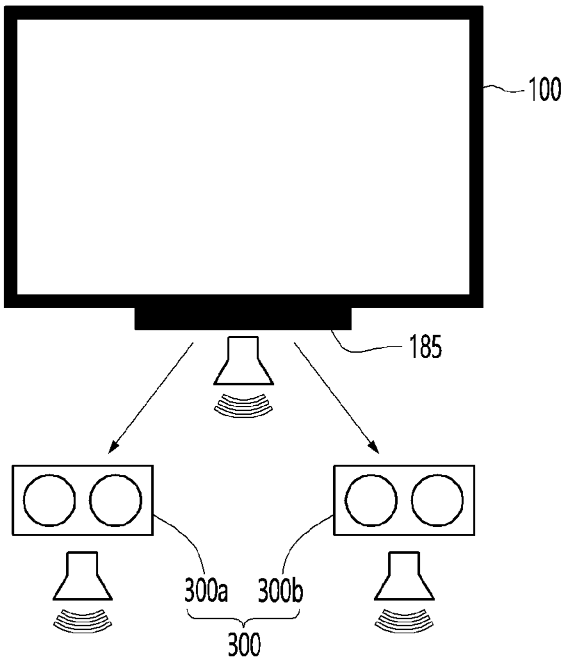
FIG. 5 is a diagram showing a surround sound system according to an embodiment of the present disclosure.

FIG. 5 is a diagram showing a surround sound system according to an embodiment of the present disclosure.

A surround sound system according to an embodiment of the present disclosure may include a display device 100 and at least one external speaker 300. The display device 100 may be the display device described with reference to FIGS. 1 to 4. The external speaker 300 may be a speaker connected to the display device 100 in a wired or wireless manner.

is assumed that the external speaker 300 is a speaker connected to the display device 100 through Bluetooth, but this is only an example for convenience of description and is not limited thereto.

In addition, hereinafter, it is assumed that the external speaker 300 includes a first external speaker 300*a* and a second external speaker 300*b*, but similarly, this is only an example for convenience of description and is not limited thereto. That is, the number of external speakers 300 connected to the display device 100 may vary.

When the first external speaker 300*a* and the second external speaker 300*b* are connected to the display device 100, the display device 100 may output a center sound through the audio output interface 185 and output a left surround sound, and the second external speaker 300*b* may output a right surround sound. However, this is also only an example, and devices which respectively outputs a center sound, a left surround sound, and a right surround sound may be changed according to an installation environment of the display device 100, the first external speaker 300*a*, and the second external speaker 300*b*.

The audio output interface 185 may mean a speaker provided inside the display device 100.

The controller 170 may control the audio output interface 185 and the external speaker 300 to output a sound when the external speaker 300 is connected.

Meanwhile, in order for the surround sound system to effectively provide a surround sound, it is necessary to achieve a balance between the level of sound output from a speaker provided in the display device 100 and the level of the sound output from the external speaker 300.

For example, when one of the level of sound output from the display device 100 and the level of sound output from the external speaker 300 is too large or smaller than the other, the volume balance may not be achieved. Likewise, even when one of the sound level of the first external speaker 300*a* and the sound level of the second external speaker 300*b* is too large or small than the other, the volume balance may not be achieved. In this way, when the volume balance is not achieved, there is a problem that the sense of reality is rather deteriorated.

However, when the user manually adjusts the volume of the display device 100 and the volume of each of the first and second external speakers 300*a* and 300*b* while listening to sound directly, it is troublesome, and there is a limit for a user without expertise to control each volume.

In order to solve this problem, the volume of each of the first and second external speakers 300*a* and 300*b* corresponding to a set volume of the display device 100 may be set in advance. In this case, there is a problem in that the volume balance is not adjusted as intended due to the output volume of each of the first and second external speakers 300*a* and 300*b*, installation environments, or the like.

Figure 6:
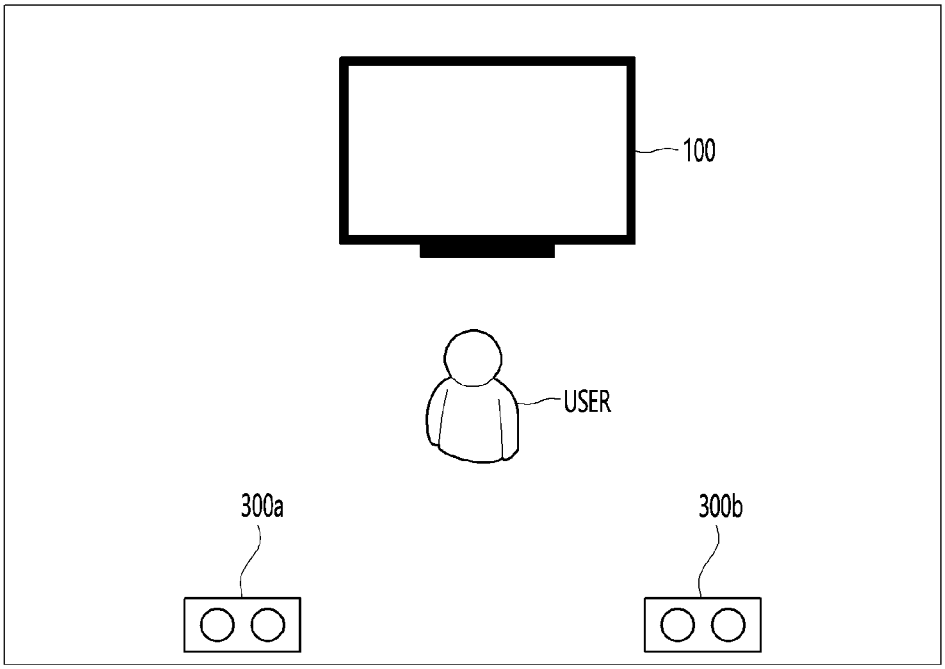
FIG. 6 is an exemplary diagram showing various installation environments of a surround sound system according to an embodiment of the present disclosure.
Figure 6:
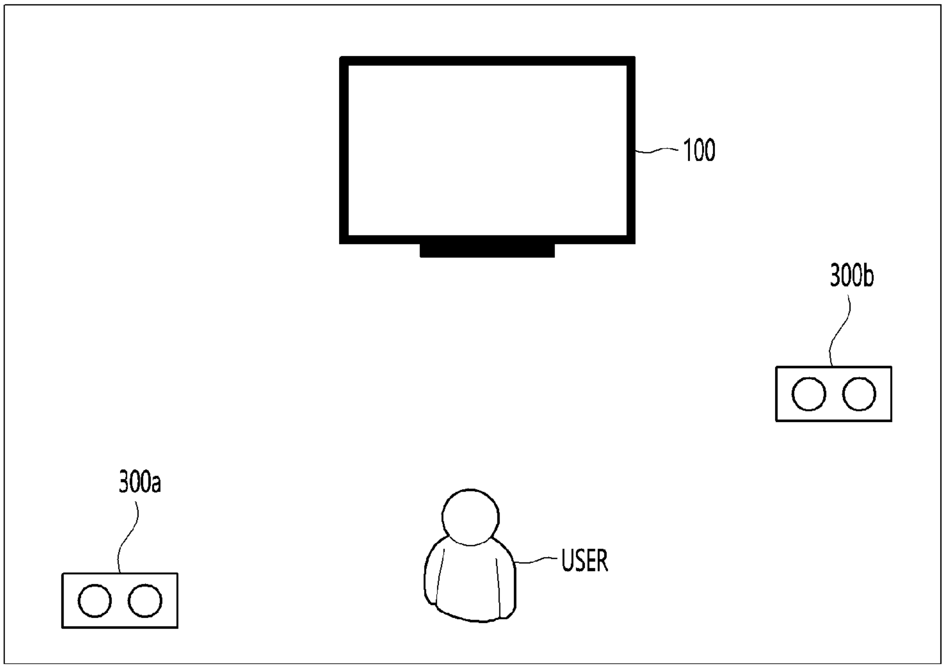

FIG. 6 is an exemplary diagram showing various installation environments of a surround sound system according to an embodiment of the present disclosure.

When the first and second external speakers 300*a* and 300*b* are connected to the display device 100, there is a problem in that it is difficult to adjust the volume balance due to the output volume and the installation environment, or the like. Hereinafter, the above-described problem will be described in detail with reference to the surround sound system shown in (a) and (b) of FIG. 6.

For example, (a) of FIG. 6 may show installation positions of the display device 100 and the first and second external speakers 300 for providing an optimal surround sound effect. When the surround sound system is installed as shown in (a) of FIG. 6, a distance between the user and the display device 100 may be appropriate, and the balance between the first external speaker 300*a* and the second external speaker 300*b* may be achieved.

However, the output power of the first external speaker 300*a* and the output power of the second external speaker 300*b* may be different. For example, in a case where the output power of the first external speaker 300*a* is 700 W and the output power of the second external speaker 300*b* is 300 W, the display device 100 controls the first external speaker 300*a* and the first external speaker 300*b* with the same volume, the sound of the first external speaker 300*a* is output higher than that of the second external speaker 300*b*, making the volume balance unachievable.

As another example, (b) of FIG. 6 is an exemplary view showing the positions of the display device 100 and the first and second external speakers 300 that are unevenly installed due to the internal structure of the user's house or the like. In a case the surround sound system is installed as shown in (b) of FIG. 6, since the distance between the user USER and the first external speaker 300*a* is too short compared to the distance between the user USER and the display device 100, a right surround sound will sound louder than a center sound, making the volume balance unachievable. In addition, since the distance between the user USER and the first external speaker 300*a* is different from the distance between the user USER and the second external speaker 300*b*, the display device 100 is used as the first external speaker 300*a*, the sound of the first external speaker 300*a* is output at a sound level less than that of the second external speaker 300*b* when the display device 100 controls the first external speaker 300*a* and the second external speaker 300*b* with the same volume, making the volume balance unachievable. In addition, although only the installation distance is described in (b) of FIG. 6, the volume balance may not be achieved even due to an obstacle between the user USER and the external speaker 300.

Accordingly, the display device 100 according to an embodiment of the present disclosure controls the volume of the external speaker 300 such that the volume balance is achieved regardless of the installation condition of the surround sound system.

Figures 7, 8:
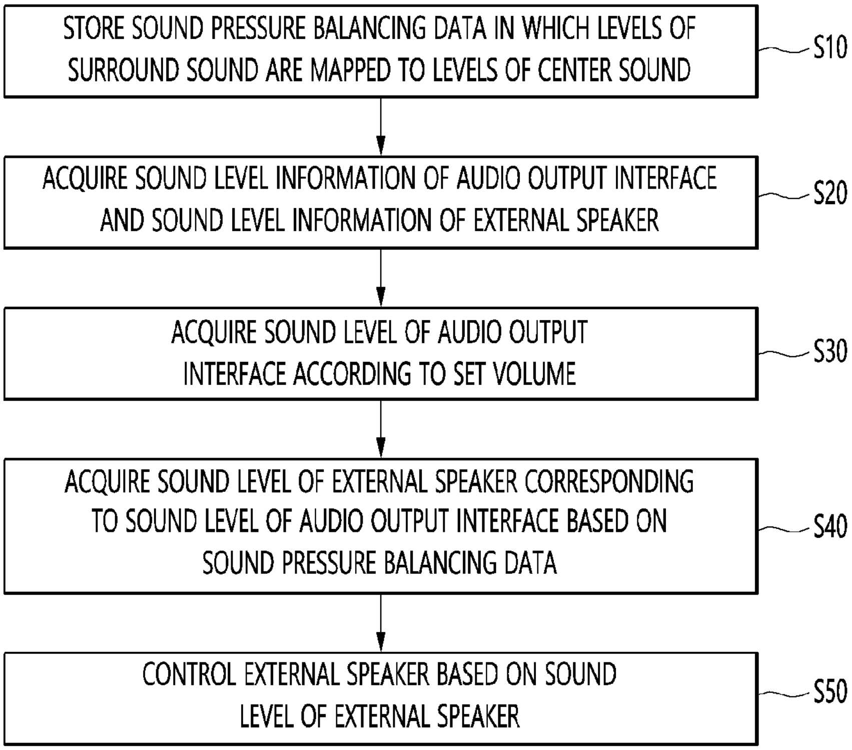
FIG. 7 is a flowchart showing a method of operating a display device according to an embodiment of the present disclosure.
FIG. 8 is an exemplary diagram of sound pressure balancing data stored by a display device according to an embodiment of the present disclosure.

FIG. 7 is a flowchart showing a method of operating a display device according to an embodiment of the present disclosure.

The storage 140 may store sound pressure balancing data in which levels of the surround sound are mapped to the levels of the center sound (S10).

The storage 140 may store the sound pressure balancing data in advance. For example, the storage 140 may receive and store the sound pressure balancing data when the display device 100 is installed.

The sound pressure balancing data may be data in which an appropriate sound level is set for each sound such that an optimal sound effect is provided.

FIG. 8 is an exemplary diagram of sound pressure balancing data stored by a display device according to an embodiment of the present disclosure.

Referring to the example of FIG. 8, the sound pressure balancing data may be data in which levels of the surround sound are mapped to levels of the center sound.

As shown in the example of FIG. 8, the sound pressure balancing data may be stored in the storage 140 in a table format, but this is only exemplary.

Specifically, the sound pressure balancing data may include data in which when the level of the center sound is 0, the level of a first surround sound and the level of a second surround sound are mapped to 0, when the level of the center sound is 2, the level of the first surround sound and the level of the second surround sound are mapped to 1, when the level of the center sound is 10, the level of the first surround sound and the level of the second surround sound are mapped to 8, . . . , when the level of the center sound is 70, the level of the first surround sound and the level of the second surround sound are mapped to 45, when the level of the center sound is 75, the level of the first surround sound and the level of the second surround sound are mapped to 50, and when the level of the center sound is 80, the level of the first surround sound and the level of the second surround sound are mapped to 60.

On the other hand, in FIG. 8, when the levels of the center sound are 0, 2, 10, . . . , 70, 75, and 80, the levels of the first and second surround sounds are mapped to each other, but this is merely an example for convenience of description. That is, the level of the center sound may be more diverse. In addition, the levels of the first and second surround sounds for each of the levels of the center sound are exemplary only and are not limited thereto.

In addition, in FIG. 8, a sound pressure level (SPL) is used as the unit of the sound level. The SPL represents the sound pressure level, and is an equation obtained by calculating the intensity of sound as a sound pressure, and the unit may be decibels (dB).

However, these units are only exemplary. That is, the unit of the sound level of the sound pressure balancing data stored in the storage 140 may be diverse.

The storage 140 may store the sound pressure balancing data for each acoustic channel. That is, the controller 170 may store data in which sound levels for each sound type are mapped to sound channels.

Here, the sound channels may include 2 channels, 2.1 channels, 3 channels, 3.1 channels, 3.2 channels, 4 channels, 7.1 channels, and the like.

The sound pressure balancing data shown in FIG. 8 may be a table in which levels of a first surround sound (left sound) and a second surround sound (right sound) are mapped with respect to the levels of the center sound, which is a 3-channel sound.

The sound pressure balancing data may be sound level information set by an acoustic expert.

Again, details will be described with reference to FIG. 7.

The controller 170 may acquire sound level information of the audio output interface 185 and sound level information of the external speaker 300 (S20).

Depending on the installation position of the external speaker 300, the sound level of the external speaker 300 heard by the user may vary.

In addition, even when the installation environment of the surround sound system is the same, the level of a sound output from the audio output interface 185 and the level of a sound output from the external speaker 300 may vary according to the viewing position of the user, so that there may be a difference in the stereoscopic sound.

Accordingly, the controller 170 may obtain the sound level information of the audio output interface 185 and the sound level information of the external speaker 300 at the user viewing position in advance, and then store the information in the storage 140.

When the first external speaker 300*a* and the second external speaker 300*b* are connected through the wireless communication interface 173, the controller 170 may store sound level information of the audio output interface 185, sound level information of the first external speaker 300*a*, and sound level information of the second external speaker 300*b*. When two or more external speakers, for example, N external speakers are connected through the wireless communication interface 173, the controller 170 may store the sound level information of the audio output interface 185 and the sound level information of each of the N external speakers.

Figure 9:
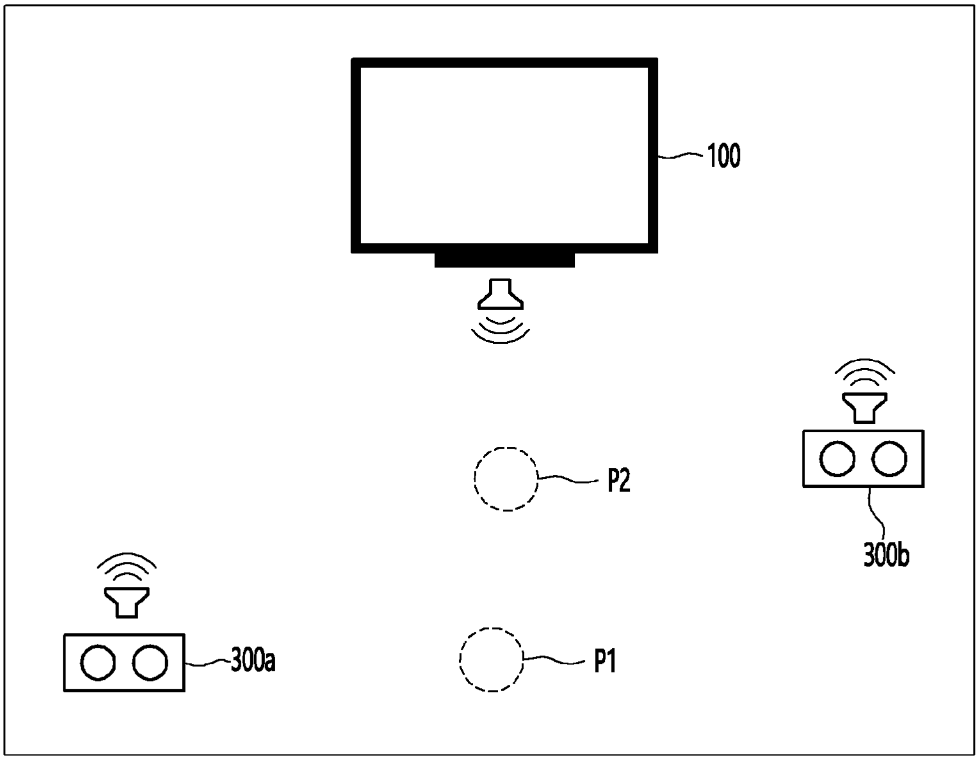
FIG. 9 is an exemplary diagram for describing a method of acquiring sound level information at a viewing position in a display device according to an embodiment of the present disclosure.

FIG. 9 is an exemplary diagram for describing a method of acquiring a sound level at a viewing position in a display device according to an embodiment of the present disclosure.

Even when the installation location of the first external speaker 300*a* and the installation location of the second external speaker 300*b* are equal to each other with respect to the display device 100, a user in a certain house may mainly watch an image at a first location P1, while a user in another house may mainly view an image at the second location P2 according to the structures of the houses. That is, even when the surround sound system has the same installation environment, the viewing positions may be different for users.

As shown in the example of FIG. 9, when the display device 100 equally control the volumes of the first and second external speakers 300*a* and 300*b*, despite the viewing positions being different such as the first position P1 or the second position P2, the user at the first position P1 may feel stereoscopic sound while the user at the second position P2 may not feel stereoscopic sound.

Accordingly, the controller 170 may acquire sound level information of the audio output interface 185 and sound level information of the external speaker 300 with respect to the viewing position of a user.

For example, the remote control device 200 may be located at the first position P1 or the second position P2.

However, the first position P1 and the second position P2 are merely examples for convenience of description.

The controller 170 may recognize the location of the remote control device 200 as the user's viewing position Accordingly, the controller 170 may transmit a control command such that the remote control device 200 acquires an audio signal in order to obtain sound level information of each of the audio output interface 185 and the external speaker 300 based on the viewing position of the user.

The remote control device 200 may receive an audio signal acquisition command through the user input interface 150. In this case, the remote control device 200 may acquire an audio signal by recording ambient sound through the voice acquisition module 290.

The controller 170 may acquire an audio signal by recording sound sequentially output from the audio output interface 185, the first external speaker 300*a*, and the second external speaker 300*b*, respectively. In this case, the order of devices that output sound may be changed.

The controller 170 may control the audio output interface 185, the first external speaker 300*a*, and the second external speaker 300*b* to output a test sound.

Specifically, the controller 170 may control the audio output interface 185 to output the test sound while changing a set volume from the minimum value to the maximum value, and when the test sound is being output from the audio output interface 185, the remote control device 200 may acquire a first audio signal.

Here, the set volume refers to a volume set in the display device 100, and the minimum value may be 0 and the maximum value may be 100, but they are only exemplary.

In addition, the controller 170 may control the first external speaker 300*a* to output the test sound while changing a control volume of the first external speaker 300*a* from the minimum value to the maximum value, and when the test sound is being output from the first external speaker 300*a*, the remote control device 200 may acquire a 2-1 audio signal.

Similarly, the controller 170 may control the second external speaker 300*b* to output the test sound while changing a control volume of the second external speaker 300*b* from the minimum value to the maximum value, and when the test sound is being output from the second external speaker 300*b*, the remote control device 200 may acquire a 2-2 audio signal.

Here, the control volumes of the external speakers 300*a* and 300*b* refer to the volumes of the external speakers 300*a* and 300*b* controlled by the display device 100, and the minimum value may be 0 and the maximum value may be 127, and they are merely examples. For example, the control volumes may mean the volume of the external speakers 300*a* and 300*b* controlled by the display device 100 through Audio/Video Remote Control Profile (AVRCP).

AVRCP is a profile included in the Bluetooth specification, and may be a protocol capable of controlling an external speaker connected to the display device 100. In addition, in the first audio signal, the 2-1 audio signal and the 2-2 audio signal as described above, ordinal numbers such as 'first', '2-1', and '2-2' are given for convenience of description and therefore, and are not limited thereto.

In this way, the controller 170 may control the remote control device 200 to acquire an audio signal obtained by recording a test sound output from each of the audio output interface 185, the first external speaker 300*a*, and the second external speaker 300*b* while controlling the audio output interface 185, the first external speaker 300*a*, and the second external speaker 300*b* to output the test sound.

The controller 170 may acquire at least one of the sound level information of sound output from the audio output interface 185 or sound level information of sound output from the external speaker 300 based on the audio signal received from the remote control device 200 from the user input interface 150.

Specifically, the controller 170 may acquire the sound level of the audio output interface 185 for each set volume based on the audio signal obtained by recording sound output from the audio output interface 185. That is, the controller 170 may acquire a sound level of the audio output interface 185 for each set volume at the location of the remote control device 200 based on the first audio signal.

Similarly, the controller 170 may acquire a sound level of the external speaker 300 for each control volume of the external speaker 300 based on an audio signal obtained by recording the sound output from the external speaker 300. Specifically, the controller 170 may acquire a sound level of the first external speaker 300*a* for each control volume of the first external speaker 300*a* at the location of the remote control device 200 based on the 2-1 audio signal obtained by recording the sound output from the first external speaker 300*a*. In addition, the controller 170 may acquire a sound level of the second external speaker 300*b* for each control volume of the second external speaker 300*b* at the location of the remote control device 200 based on the 2-2 audio signal obtained by recording the sound output from the second external speaker 300*b*.

According to the above-described method, there is an advantage in that an actual level of sound the user hears with respect to each of the audio output interface 185, the first external speaker 300*a*, and the second external speaker 300*b* at the viewing position of the user can be measured more accurately.

Figure 10:
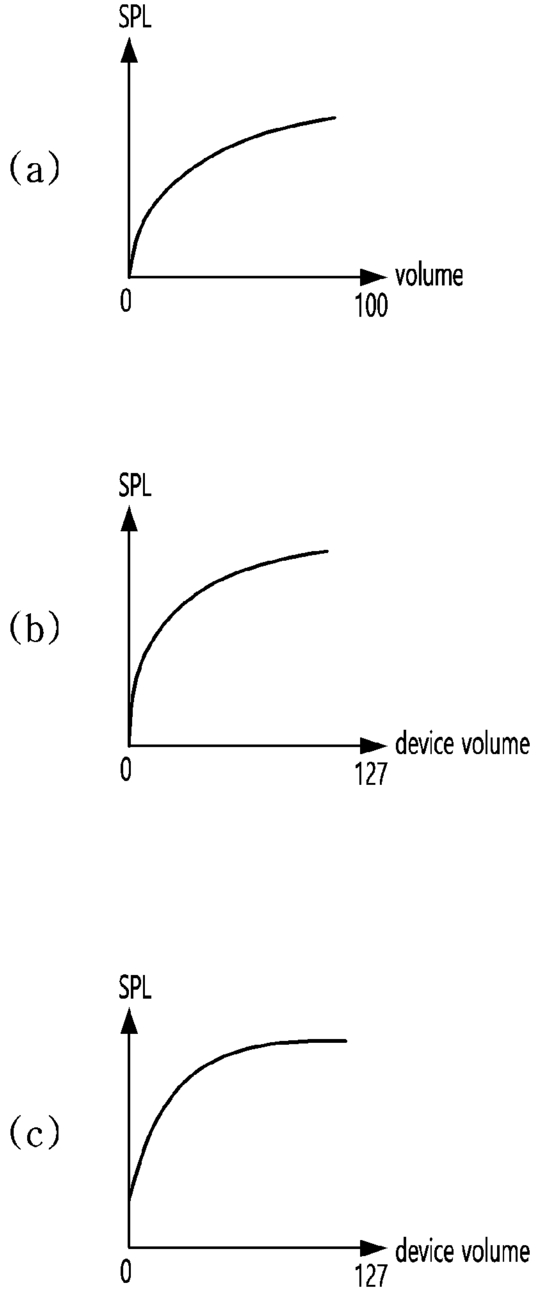
FIG. 10 is an exemplary diagram of sound level information for each device at a viewing position obtained by a display device according to a first embodiment of the present disclosure.

FIG. 10 is an exemplary diagram of sound level information for each device at a viewing position obtained by a display device according to a first embodiment of the present disclosure, and FIGS. 11 to 13 are exemplary diagrams of sound level information for each device at a viewing position obtained by a display device according to a first embodiment of the present disclosure.

For example, the controller 170 may store, in the storage 140, at least one of main sound data in which a sound level of the audio output interface 185 is mapped to each set volume based on the audio signal received from the remote control device 200 or sub-sound data in which a sound level of the external speaker 300 is mapped to each control volume of the external speaker 300.

That is, the sound level information of the audio output interface 185 obtained through step S20 may include the main sound data, and the sound information of the external speaker 300 may include the sub-sound data.

According to a first embodiment, the controller 170 may store the sound level of the audio output interface 185 and the sound levels of the external speakers 300*a* and 300*b* in the storage 140 in a graph form. That is, according to the first embodiment, the main sound data and the sub-sound data may have a graph form.

A graph shown in (a) of FIG. 10 is a first curve in which sound levels (SPL) are mapped to set volumes of the display device 100, a graph shown in (b) of FIG. 10 is a second curve in which sound levels (SPL) are mapped to device volumes of the first external speaker 300*a*, and a graph shown in (c) of FIG. 10 is a third curve in which sound levels (SPL) are mapped to device volumes of the second external speaker 300*b*. In this case, the main sound data may include the first curve, and the sub-sound data may include the second curve and the third curve.

According to a second embodiment, the controller 170 may store the sound level of the audio output interface 185 and the sound levels of the external speakers 300*a* and 300*b* in the storage 140 in a table form. That is, according to the second embodiment, the main sound data and the sub-sound data may have a table form.

A table shown in FIG. 11 is a first table in which sound levels are mapped to set volumes of the display device 100, a table shown in FIG. 12 is a second table in which sound levels are mapped to device volumes of the first external speaker 300*a*, and a table shown in FIG. 13 is a third curve in which sound levels are mapped to device volumes of the second external speaker 300*b*. In this case, the main sound data may include the first table, and the sub-sound data may include the second table and the third table.

Meanwhile, in the first and second embodiments, it is described that the controller 170 stores each of the sound levels of the audio output interface 185 and the sound levels of the external speakers 300*a* and 300*b* in a graph form or a table form, but the form of the data is only exemplary and is not limited thereto.

On the other hand, when the controller 170 may store first main sound data or first sub-sound data in the storage 140 based on the audio signal obtained by the remote control device 200 at the first position P1, and second main sound data or second sub-sound data in the storage 140 based on the audio signal obtained by the remote control device 200 at the second position P2, the first main sound data may be different from the second main sound data, and the first sub-sound data may be different from the second sub-sound data.

In addition, the controller 170 may update the main sound data and the sub-sound data when a sound optimization command is received or when the external speaker 300 is first connected to the wireless communication interface 173.

As a specific example, the controller 170 may receive the sound optimization command. The sound optimization command may be a command for updating the main sound data and the sub-sound data. The user may input the sound optimization command through the remote control device 200 for example, in the case of changing the viewing position or changing the installation position of the external speaker 300. Accordingly, the controller 170 updates the main sound data and the sub-sound data through the sound optimization command, thus adaptively responding to the installation environment of the surround sound system.

In addition, when the external speaker 300 is first connected to the wireless communication interface 173, the controller 170 automatically detects a change in the installation environment of the surround sound system, and has the advantage of automatically adjusting the volume balance accordingly.

Again, details will be described with reference to FIG. 7.

When the controller 170 acquires sound pressure balance data, the sound level information of the audio output interface 185 and the sound level information of the external speaker 300, the controller 170 may adjust a sound level of the external speaker 300 according to the sound level of the audio output interface 185.

That is, the controller 170 may acquire a level of the center sound that is most similar to a sound level of the audio output interface 185 from the sound pressure balancing data, acquire a level of the surround sound mapped to the acquired level of the center sound, and control the external speaker 300 to output sound at the acquired level of the surround sound. Details will be described through steps S30, S40 and S50.

The controller 170 may acquire a sound level of the audio output interface 180 according to a set volume (S30).

The user may adjust a volume through a button provided on the display device 100 or a button provided on the remote control device 200.

A set volume may be changed as a volume control command is received through the button provided on the display device 100 or the button provided on the remote control device 200.

The controller 170 may acquire a sound level of the audio output interface 180 according to the current set volume from the main sound data stored in the storage 140. When the set volume is changed, the controller 170 may change the sound level of the audio output interface 185 based on the main sound data.

Referring to the example of FIG. 11, when the set volume is 2, the controller 170 may acquire the sound level of the audio output interface 180 as 3 (dBSPL), and when the set volume is changed to 98, the controller 170 may change a sound level of the audio output interface 180 to 65 (dBSPL).

When the sound level of the audio output interface 185 is changed, the controller 170 may change the control volume of the external speaker 300.

Hereinafter, it is assumed that, when the set volume is the first volume (for example, 100), the controller 170 acquires a first level (for example, 70) that is the sound level of the audio output interface 185 from the main sound data shown in FIG. 11.

The controller 170 may acquire a sound level of the external speaker 300 corresponding to the sound level of the audio output interface 185 based on the sound pressure balancing data (S40).

In the previous step, it is assumed that the first level (for example, 70) is acquired as the sound level of the audio output interface 185.

The controller 170 may acquire a second level (e.g., 70), which is the level of the center sound most similar to the first level, from the sound pressure balancing data shown in FIG. 8.

Specifically, the controller 170 may acquire a level of the center sound that matches the first level when there is a level of the center sound that matches the first level in the sound pressure balancing data, and acquire a level of the center sound obtain the size of the center sound having the smallest difference with respect to the first level when there is no level of the center sound matching the first level in the sound pressure balancing data.

The controller 170 may acquire a third level, which is a level of the surround sound corresponding to the second level (e.g., 70), which is the level of the center sound most similar to the first level, from the sound pressure balancing data.

Depending on types of surround sound, the number of the third levels may be one or two or more.

The controller 170 may acquire a 3-1 level (e.g., 45) which is the level of the first surround sound corresponding to the second level (e.g., 70) and a 3-2 level (e.g., 45), which is the level of the second surround sound corresponding to the second level (e.g., 70). The third level may include the 3-1 level and the 3-2 level.

The controller 170 may acquire a fourth level, which is the sound level of the external speaker 300 most similar to the third level, from the sub-sound data.

Specifically, the controller 170 may acquire a 4-1 level (e.g., 45), which is the sound level of the first external speaker 300*a* that is most similar to the 3-1 level, from the sub-sound data as shown in FIG. 12, and acquire a 4-2 level (e.g., 45), which is the sound level of the second external speaker 300*b* that is most similar to the 3-2 level, from the sub-sound data as shown in FIG. 13. The fourth level may include a 4-1 level and a 4-2 level.

The controller 170 may control the external speaker 300 based on the sound level of the external speaker 300 (S50).

The controller 170 may control the external speaker 300 by acquiring a control volume of the external speaker 300 based on the sound level of the external speaker 300.

The controller 170 may acquire a second volume, which is a control volume of the external speaker 300 mapped to the above-described fourth level, from the sub-sound data.

Specifically, the controller 170 may acquire a 2-1 level (e.g., 90), which is the sound volume of the first external speaker 300*a* mapped to the 4-1 level (e.g., 45) from the sub-sound data as shown in FIG. 12, and acquire a 2-2 level (e.g., 50), which is the sound volume of the second external speaker 300*b* mapped to the 4-2 level from the sub-sound data as shown in FIG. 12. The second volume may include a 2-1 volume and a 2-2 volume.

The controller 170 may control the first external speaker 300*a* to output the first surround sound at the 2-1 volume (e.g., 90), and control the second external speaker 300*b* to output the second surround sound at the 2-2 volume (e.g., 50).

In this way, although the controller 170 controls the control volumes of the first external speaker 300*a* and the second external speaker 300*b* differently, the first external speaker 300*a* and the second external speaker 300*b* may output a first surround sound and a second surround sound at the same sound level.

In summary, the controller 170 may control the volume of the external speaker 300 according to the level of the sound output from the audio output interface 185. That is, the controller 170 may control a volume of the external speaker 300 according to the set volume.

Through this, the controller 170 may control the volume of the external speaker 300 such that the surround sound is output at an appropriate level according to the level of the main sound output through the audio output interface 185. In this case, since the level of the surround sound is automatically adjusted even when the user adjusts only the set volume, there is an advantage that the user does not have to manually adjust the volume of the external speaker 300 so as to provide stereoscopic sound effect, thus providing convenience to the user.

That is, there is an advantage that it is easy to adjust the volume balance between the speaker provided in the display device 100 and the external speaker 300.

Meanwhile, the shape of each of the curves illustrated in FIG. 10 and the numerical values of each of the tables illustrated in FIGS. 11 to 13 are provided as examples for convenience of description. Each of the shapes of the curves shown in FIG. 10 and the numerical values of each of the tables shown in FIGS. 11 to 13 may be determined and changed in the case of measurement in step S20.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

The invention claimed is:

1. A display device comprising:

an audio output interface;

a wireless communication interface configured to connect to at least one external speaker;

a user input interface; and a controller configured to:

cause the audio output interface to output a first sound and the at least one external speaker to output a second sound;

receive a first audio signal corresponding to the first sound or a second audio signal corresponding to the second sound from a remote control device through the user input interface, acquire at least one of information on a level of the first sound output from the audio output interface based on the received first audio signal or information on a level of the second sound output from the at least one external speaker based on the received second audio signal, and control a volume of the at least one external speaker according to the level of the first sound output from the audio output interface, wherein the display device further comprises a storage configured to store sound pressure balancing data for mapping the level of the second sound to each sound level of the first sound.

2. The display device of claim 1, wherein the volume of the at least one external speaker is controlled according to a set volume of the display device.

3. The display device of claim 1, wherein the controller is further configured to:

acquire the level of the first sound from the stored sound pressure balancing data, wherein the acquired level of the first sound is most similar to the level of the first sound output from the audio output interface, and acquire the level of the second sound mapped to the acquired level of the first sound, wherein the volume of the at least one external speaker is controlled according to the acquired level of the second sound.

4. The display device of claim 1, wherein the controller is further configured to:

cause the remote control device to acquire the first audio signal based on the audio output interface being controlled to output a test sound while changing a set volume from a minimum value to a maximum value, and cause the remote control device to acquire the second audio signal based on the at least one external speaker being controlled to output the test sound while changing a control volume of the at least one external speaker from a minimum value to a maximum value.

5. The display device of claim 1, wherein the controller is further configured to acquire the level of the first sound output from audio output interface for each set volume based on the received audio signal obtained by recording the first sound output from the audio output interface.

6. The display device of claim 1, wherein the level of the second sound output from at least one external speaker is acquired for each control volume of the at least one external speaker based on the received audio signal obtained by recording the second sound output from the at least one external speaker.

7. The display device of claim 1, further comprising a storage configured to store at least one of main sound data for mapping levels of the audio output interface to set volumes or sub sound data for mapping levels of the at least one external speaker to control volumes of the at least one external speaker based on the received audio signal.

8. The display device of claim 7, wherein the storage is further configured to store sound pressure balancing data for mapping levels of the second sound to each level of the first sound, and wherein the controller is further configured to:

acquire a first level from the main sound data, wherein the first level corresponds to the level of the first sound output from the audio output interface based on a set volume being a first volume, acquire a second level from the stored sound pressure balancing data, wherein the second level corresponds to the level of the first sound most similar to the acquired first sound level, acquire a third level from the stored sound pressure balancing data, wherein the third level corresponds to a level of the second sound corresponding to the acquired second level, acquire a fourth level from the stored sub sound data, wherein the fourth level corresponds to the level of the second sound output from at least one external speaker most similar to the acquired third level, acquire a second volume from the stored sub sound data, wherein the second volume corresponds to a control volume of the at least one external speaker mapped to the acquired fourth level, and control a volume of the at least one external speaker to the acquired second volume.

9. The display device of claim 7, wherein the controller is further configured to:

store first main sound data or first sub sound data in the storage based on the audio signal being acquired at a first location by the remote control device, and store second main sound data or second sub sound data in the storage based on the audio signal being acquired at a second location by the remote control device, wherein the first main sound data is different from the second main sound data and the first sub sound data is different from the second sub sound data.

10. The display device of claim 7, wherein the controller is further configured to update the main sound data and the sub sound data based on receiving a sound optimization command or the at least one external speaker being initially connected to the wireless communication interface.

11. The display device of claim 1, wherein the controller is further configured to:

change the level of the first sound output from the audio output interface based on a set volume being changed, and change a control volume of the at least one external speaker based on the level of the first sound output from the audio output interface being changed.

12. The display device of claim 1, further comprising a storage configured to store level information of the audio output interface, level information of a first external speaker among the at least one external speaker, and the level information of a second external speaker among the at least one external speaker based on the first external speaker and the second external speaker being connected through the wireless communication interface.

13. A surround sound system comprising:

a display device comprising a user input interface and an audio output interface; and an external speaker connected to the display device, wherein the display device is configured to output a first sound, wherein the external speaker is configured to output a second sound, and wherein the display device is configured to:

cause the audio output interface to output a first sound and the external speaker to output a second sound;

receive a first audio signal corresponding to the first sound or a second audio signal corresponding to the second sound from a remote control device through the user input interface, acquire at least one of information on a level of the first sound output from the audio output interface based on the received first audio signal or information on a level of the second sound output from the at least one external speaker based on the received second audio signal, and control a volume of the external speaker according to the level of the first sound output from the display device, wherein the display device further comprises a storage configured to store sound pressure balancing data for mapping the level of the second sound to each level of the first sound.

14. The surround sound system of claim 13, wherein the volume of the external speaker is controlled according to a set volume of the display device.

15. The surround sound system of claim 13, wherein the display device is further configured to:

acquire the level of the first sound from the stored sound pressure balancing data, wherein the level of the first sound is most similar to the level of the first sound output from the audio output interface, and acquire the level of the second sound mapped to the acquired level of the first sound, wherein the volume of the external speaker is controlled according to the acquired level of the second sound.

16. The surround sound system of claim 13, wherein the display device is further configured to:

cause the remote control device to acquire the first audio signal based on the audio output interface being controlled to output a test sound while changing a set volume from a minimum value to a maximum value, and cause the remote control device to acquire the second audio signal based on the external speaker being controlled to output the test sound while changing a control volume of the external speaker from a minimum value to a maximum value.

* * * * *